United States Patent [19]
Mandel

[11] Patent Number: 5,791,114
[45] Date of Patent: Aug. 11, 1998

[54] QUICK-ASSEMBLY INTERLOCKING TILE

[76] Inventor: Nigel Mandel, 1823 58th St., Brooklyn, N.Y. 11204

[21] Appl. No.: 831,223

[22] Filed: Apr. 2, 1997

[51] Int. Cl.$^6$ ............................................. E04B 2/08
[52] U.S. Cl. ............................. 52/591.3; 52/592.1
[58] Field of Search .................... 52/578, 589.1, 52/590.1, 590.2, 590.3, 591.1, 591.2, 591.3, 592.1, 592.2, 592.4

[56] References Cited

U.S. PATENT DOCUMENTS

| | | |
|---|---|---|
| 654,532 | 7/1900 | Furness ........................ 52/591.3 X |
| 713,420 | 11/1902 | Flood . | |
| 3,692,201 | 9/1972 | Garouna ....................... 52/591.2 X |
| 4,018,025 | 4/1977 | Collette . | |

FOREIGN PATENT DOCUMENTS 254 7637  4/1977  Germany ................. 52/591.2

*Primary Examiner*—Creighton Smith
*Attorney, Agent, or Firm*—Easton & Echtman, P.C.; Edward N. Gewirtz

[57] ABSTRACT

A specially designed beveled edge (26) guides tile interlocks (14) into place and holds them in place during assembly, thereby facilitating ease and speed of interlocking tile (10) assembly for tight fitting interlocks which actually lock contiguous tiles together. Assembly time for an entire surface using such interlocking tiles is greatly reduced in comparison to comparable prior art interlocking tiles with no diminution in interlocking quality or tile wear.

4 Claims, 1 Drawing Sheet

QUICK-ASSEMBLY INTERLOCKING TILE

BACKGROUND—FIELD OF INVENTION

This invention relates to interlocking tiles.

BACKGROUND AND SUMMARY OF THE INVENTION

Interlocking tiles have been on the market for many years. The use of individual interlocking tiles permits the construction of a floor or other surface covering which may be easily adapted to different sized and shaped areas. Interlock designs greatly simplify tile installation in that they alleviate the need for adhesives. Interlocking tiles can provide coverings for a floor or other surface which can be easily laid down and later removed when necessary because of the absence of the adhesives. Further, the individual tiles can be rearranged to conform to changes in layout and thus can even be reused at a later time for a different floor.

Interlocking tiles typically have protruding elements and corresponding receptive cavities which allow tiles to be interlocked with adjacent tiles. The interlocks are usually designed so that the protruding elements of one tile fit snugly into the receptive cavities of adjacent tiles in order to prevent the assembled interlocked tiles from slipping and coming apart while in use as a surface covering. In order for the interlock design to be successful in holding adjacent tiles together, there thus must be a tight interlock fit. The design of some interlocks provide a tight enough fit so that tiles actually lock together to the extent that when lifting one tile contiguous tiles can also be lifted. For the tiles to actually lock together there must be a very tight fit, and the tighter the fit and the more successful the design of the protruding elements and receptive cavities in holding the tiles together, the slower the process of interlocking the tiles together. Prior art interlocking tile designs, especially those that are designed so well as to actually lock tiles together, have been subject to the unfortunate limitation that the tighter the interlocking of the tiles, the more difficult the assembly.

The significance of this limitation can be seen when considering that to assemble a typical floor using interlocking tiles of this type, an assembly person must carefully line up a dozen or so interlocking protrusions of each of four sides of a tile with an equal number of receptor cavities of each of the four adjacent tiles, and then fit each of the protrusions into its corresponding receptor cavity without the other protrusions slipping out of place. While this process produces a firm interlock, it unfortunately is slower and more tedious than it need be when using prior art interlocking tiles, especially those tiles that have an optimally tight interlock which actually locks the tiles together.

The present invention provides a solution to the difficulty of assembling tight fitting, interlocking tiles which actually lock together. By providing a specially designed bevel along the periphery of the bottom outer edge of the tile, interlocking protrusions are guided into and held in place in the corresponding receptor cavities of adjacent tiles during tile assembly. Once the protruding elements of the interlocks of one tile are merely rested on top of the receptive cavities of a contiguous tile, movement of one of the tiles will cause the other to move along with it even without insertion of the protruding elements into the receptive cavities. The advantages of firm, tight interlocking are provided, and yet the interlocking tiles are more quickly and easily fitted together than prior art interlocking tiles which yield the same tight interlock. The bevel is large enough so that it facilitates assembly of the tiles, but small enough in proportion to the thickness of the tile so that it otherwise goes unnoticed in the tight interlocking fit of the tiles and in the use and wear of the tiles as a surface covering.

Figure 1:
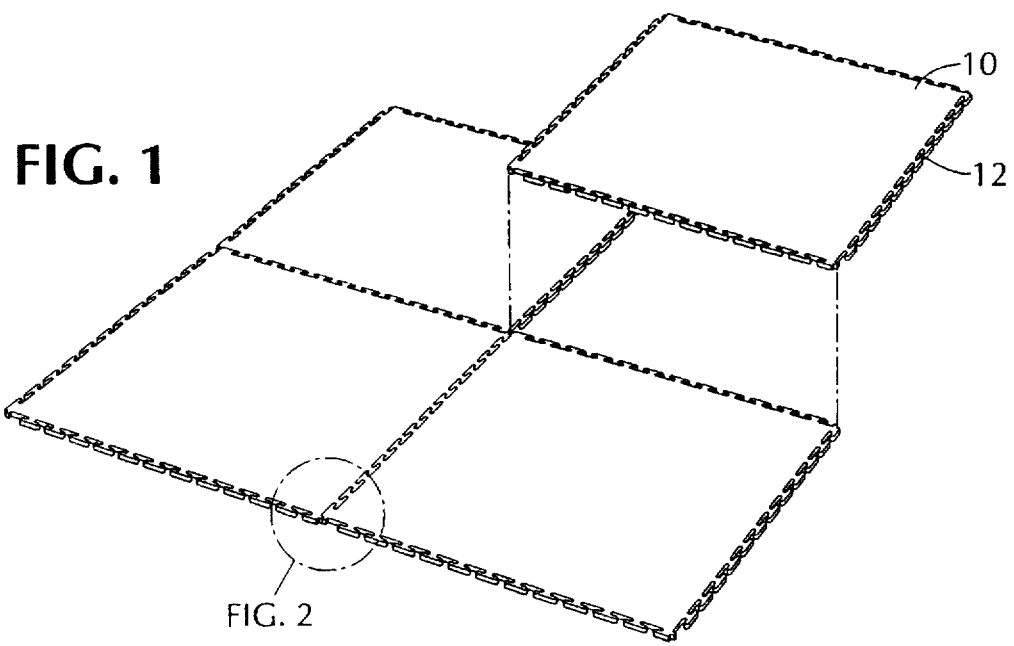
FIG. 1 is a perspective view of the quick assembly interlocking tile of the invention showing the configuration in which tiles are interlocked.

REFERENCE NUMERALS IN DRAWINGS 10 quick assembly interlocking tile
12 edge region
14 central projecting element
14a inverted projection slot
15 right corner projecting element
16 left corner projecting element
17 incurvate region
18 curvate region
19 square knob
21 joining line
22 extending line
23 corner joinin
26 bevel

DETAILED DESCRIPTION OF THE PREFERRED EMBODIMENT

Referring now to the drawings, FIG. 1 shows the quick assembly interlocking tile of the present invention, designated generally by numeral 10. The tile 10 is preferably nineteen inches by nineteen inches with a thickness of one quarter of an inch. The tile 10 has an edge region 12 which includes a plurality of interlocks.

Figure 2:
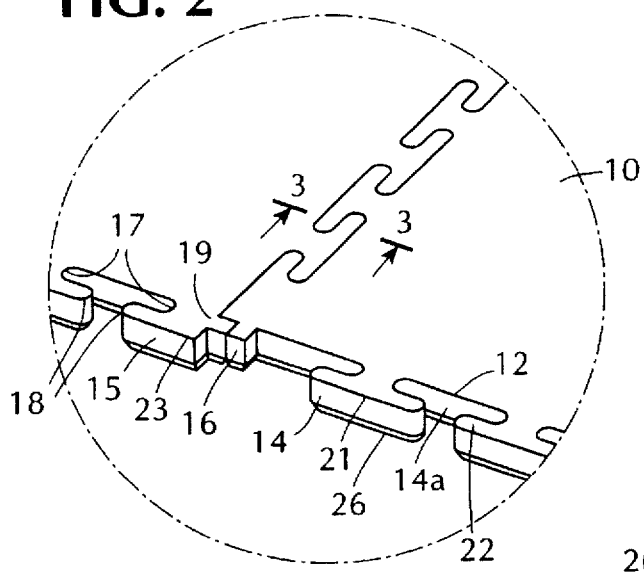
FIG. 2 is an enlarged view of two quick assembly interlocking tiles of FIG. 1 contained within the encircled region.

Referring now to FIG. 2, the interlocks are comprised of central projecting elements 14 at the edge 12, a right corner projecting element 15 at the right corner of the edge 12 of each of the four vertical sides of the tile 10, and a left corner projecting element 16 at the left corner of the edge 12 of each of the four vertical sides of the tile 10. The central projecting elements 14 are made up of two opposite incurvate regions 17 extending from the tile 10 followed by two oppositely directed extending lines 22, followed by two curvate regions 18 which are connected by ajoining line 21, and the hollow "inverted projection" slots 14a formed therebetween. The right corner projecting element 15 is made up of an incurvate region 17 extending from the tile 10 followed by a curvate region 18 and a corner joining line 23 extending to the corner of the tile. The left corner projecting element 16 is made up of a straight line having a square knob 19 parallel to the incurvate regions 16 of the other projections. This configuration allows the central projecting elements 14 and right and left corner projecting elements 15 and 16 of one tile 10 to interlock firmly with adjacently positioned inverted projection slots 14a and square knobs 19 of a contiguous tile as is clearly illustrated in FIG. 2. To achieve tight, non-slip adhesion, eleven central projecting elements 14 are provided on each of the tile's 10 four sides in addition to the corner projecting elements. Along the bottom of the tile's edge 12 is a bevel 26 which spans the periphery of the tile 10 and facilitates in the assembly of the tiles.

Figure 4:
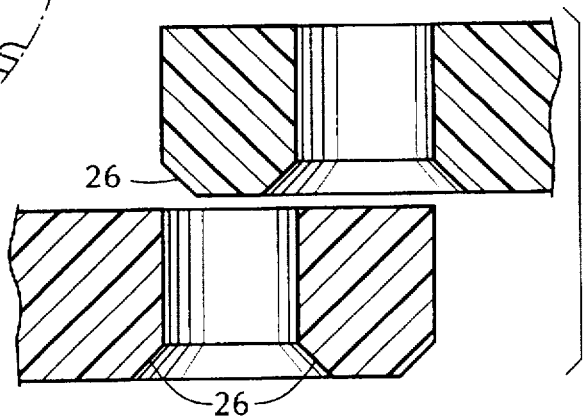
FIG. 4 is a cross sectional view as in FIG. 3, with one of the two quick assembly interlocking tiles having been elevated slightly higher than the other.

Referring now to FIG. 4, the bevel 26 is positioned along the bottom periphery of the tile's edge 12 so that it will help to guide the central projection elements 14 and corner projection elements 15 and 16 of one tile 10 into the hollow inverted projection slots 14a of a contiguous tile 10 while the tiles are being assembled. A preferred thickness 24 of the bevel 26 is three thirty-seconds of an inch.

Figure 3:
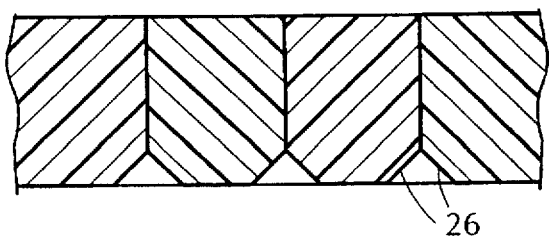
FIG. 3 is a cross sectional view of the quick assembly interlocking tiles of FIG. 2, cut along line 3—3.

Referring now to FIG. 3, once the projecting elements are interlocked together, they achieve tight, non-slip adhesion notwithstanding the bevel 26 which facilitated assembly and may facilitate reassembly at a future date.

The tile is made of polyvinyl chloride (PVC) which is less absorbent of chemicals and liquids than is rubber. PVC is also recycled, flame resistant, environment friendly and ozone friendly. Additionally, the composition of PVC allows for the interlocks of the tile to actually lock the tiles together, whereas rubber tiles which are locked together are only loosely held together by interlocks. The fact that the tiles can actually be locked together in a tile made of PVC stresses the usefulness of the specially designed bevel to facilitate assembly since the interlocks must fit very tightly together for the tiles to actually be locked together. To provide for a non-slip surface and nice appearance, evenly spaced circular protrusions of approximately one eighth of an inch are provided on the top surface of the tile. For shock absorbance during use, a waffle like pattern one eighth of an inch deep is engraved on the bottom side of the tile.

The quick assembly interlocking tile of the present invention therefore affords all the advantages of tight, non-slip adhering interlocking tiles which actually lock together and adds an important novel feature, the specially designed bevel which significantly reduces the difficulty of and time involved in assembling an entire floor or other surface of interlocking tiles. While the particular quick assembly interlocking tile described herein is one embodiment of this invention, this invention is not limited to that particular arrangement and, as will be appreciated and understood by those skilled in the art, changes may be made therein without departing from the scope of the invention which is defined in the appended claims.

I claim:

1. A quick assembly, interlocking tile, which comprises
   a. an edge region having a periphery having a bottom, said edge region having four corners, the periphery of said edge region provided with four corner interlocks extending from each of the four corners of said edge region and a plurality of central interlocks extending from said edge region between said corner interlocks to interconnect and lock said tile with contiguous tiles whereby a surface covering is constructed,
   b. said central interlocks comprising central projecting elements and alternating slots in the form of inversions of the central projecting elements formed thereby,
   c. each of said corner interlocks comprising a right corner projecting element, an alternating slot in the form of an inversion of the central projecting elements formed between the right corner projecting element and the central projecting elements, and a left corner projecting element comprising a square knob having sides of fixed length, said square knob positioned at a distance from said corner equal to the square knob's side's length.
   d. said central projecting elements and right corner projecting elements interlocking with a contiguous tile's adjacently positioned slots in the form of the inversion of a central projecting element,
   e. said edge region including a bevel at the bottom of the periphery of the edge region to facilitate the assembly of contiguous interlocking tiles,
   f. said tile including an inner region integral with said edge region.

2. The quick assembly interlocking tile of claim 1 further characterized by
   a. said central projecting elements consisting of two 180 degree oppositely directed incurvate regions extending from said edge region, two equidistant oppositely directed straight regions, one extending from each of said incurvate regions and parallel to said edge region, two 180 degree curved regions directed towards each other extending from said equidistant straight regions, said curved regions being connected by a straight line extending between said curved regions and alternating slots in the form of inversions of the central projecting elements formed thereby,
   b. said right corner interlocks comprising right corner projecting elements consisting of a 180 degree right corner incurvate region extending from said edge region, a right corner straight region parallel to said edge region extending from said right corner incurvate region, one 180 degree right corner curved region directed towards the right corner of said edge region extending from said right corner straight region, said right corner curved region being connected to the right corner of said edge region by a right corner straight line.

3. The quick assembly, interlocking tile of claim 2 further characterized by the tile being made of polyvinyl chloride.

4. The quick assembly, interlocking tile of claim 3 further characterized by the tile having a thickness of one quarter of an inch and the bevel having a thickness of three thirty seconds of an inch.

* * * * *